(12) United States Patent
Okamatsu

(10) Patent No.: US 9,376,515 B2
(45) Date of Patent: Jun. 28, 2016

(54) PRODUCTION METHOD FOR VINYL ETHER POLYMER

(71) Applicant: The Yokohama Rubber Co., LTD, Minato-ku, Tokyo (JP)

(72) Inventor: Takahiro Okamatsu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/773,688

(22) PCT Filed: Mar. 7, 2014

(86) PCT No.: PCT/JP2014/056014
§ 371 (c)(1),
(2) Date: Sep. 8, 2015

(87) PCT Pub. No.: WO2014/136950
PCT Pub. Date: Sep. 12, 2014

(65) Prior Publication Data
US 2016/0039956 A1 Feb. 11, 2016

(30) Foreign Application Priority Data
Mar. 8, 2013 (JP) .................................. 2013-046262

(51) Int. Cl.
| | | |
|---|---|---|
| *C08F 4/00* | (2006.01) | |
| *C08F 2/00* | (2006.01) | |
| *C08F 116/14* | (2006.01) | |
| *C08F 2/04* | (2006.01) | |
| *C08F 216/14* | (2006.01) | |
| *C08F 4/40* | (2006.01) | |

(52) U.S. Cl.
CPC ................. *C08F 116/14* (2013.01); *C08F 2/04* (2013.01); *C08F 4/40* (2013.01); *C08F 216/14* (2013.01); *C08F 216/1416* (2013.01)

(58) Field of Classification Search
CPC .................................................... C08F 116/14
USPC .................... 526/90, 206, 207, 210
See application file for complete search history.

(56) References Cited

U.S. PATENT DOCUMENTS

| | | |
|---|---|---|
| 2001/0047059 A1 | 11/2001 | Hitomi et al. |
| 2007/0276101 A1 | 11/2007 | Matyjaszewski et al. |
| 2008/0207841 A1 | 8/2008 | Koers et al. |
| 2011/0218306 A1 | 9/2011 | Matyjaszewski et al. |
| 2012/0156781 A1* | 6/2012 | Takahashi ............ C12N 5/0068 435/396 |

FOREIGN PATENT DOCUMENTS

| | | |
|---|---|---|
| JP | H11-080221 A | 3/1999 |
| JP | H11-279287 A | 10/1999 |
| JP | 2007-099881 | 4/2007 |
| JP | 2007-211048 | 8/2007 |
| JP | 2007-527463 | 9/2007 |
| JP | 2008-542488 | 11/2008 |
| WO | WO 2005/087819 | 9/2005 |
| WO | WO 2006/128816 | 12/2006 |
| WO | WO 2012/101886 | 8/2012 |

OTHER PUBLICATIONS

International Search Report for International Application No. PCT/JP2014/056014 dated Jun. 10, 2014, 4 pages, Japan.

* cited by examiner

*Primary Examiner* — William Cheung
(74) *Attorney, Agent, or Firm* — Thorpe North & Western

(57) ABSTRACT

A production method for a vinyl ether polymer of the present technology is a production method for a vinyl ether polymer, wherein a vinyl ether monomer is subjected to living radical polymerization using a polymerization initiator, a monovalent copper compound, a ligand which is coordinated to the above copper compound, and ascorbic acid in a solvent. The above solvent has a mass ratio of isopropyl alcohol to water from 30:70 to 0:100. A mass ratio of the above vinyl ether monomer to the above solvent is from 10:100 to 25:100. A molar ratio of copper in the above copper compound to the above ascorbic acid is from 1:0.5 to 1:2.

18 Claims, No Drawings

PRODUCTION METHOD FOR VINYL ETHER POLYMER

This is a U.S. national phase application under 35 U.S.C. Section 371 of International Patent Application No. PCT/JP2014/056014, filed on Mar. 7, 2014, and claims benefit of priority to Japanese Patent Application Nos. JP 2013-046262, filed on Mar. 8, 2013, the entire contents of which is incorporated herein by reference.

TECHNICAL FIELD

The present technology relates to a production method for a vinyl ether polymer.

BACKGROUND

Conventionally, as a polymerization method for a polymer comprising a polyvinyl ether structure, a polymerization method by living cationic polymerization has been known (see, for example, Japanese Unexamined Patent Application Publication Nos. H11-080221A and 2007-099881A).

As the polymerization method for a vinyl ether monomer, cationic polymerization is common as described in Japanese Unexamined Patent Application Publication Nos. H11-080221A and 2007-099881A, and the like, and radical polymerization has been regarded as being extremely difficult according to the knowledge of polymer synthesis hitherto.

Further, as a vinyl ether polymer obtained by polymerizing a vinyl ether monomer, molecular weight distribution (Mw/Mn) serving as the ratio of weight average molecular weight (Mw) to number average molecular weight (Mn) is preferably narrow from the viewpoint that the polymer is capable of structural control, resulting in more stable mechanical properties as a polymer. Specifically, the value of the molecular weight distribution is preferably less than 2.0, and more preferably approximately 1.5 or less.

SUMMARY

The present technology is made in consideration of the above-mentioned points, and provides a production method for a vinyl ether polymer in which a vinyl ether polymer having narrow molecular weight distribution is obtained by radical polymerization.

The present inventors have conducted diligent studies in order to achieve the above-mentioned purpose and consequently completed the present technology by finding that subjecting a vinyl ether monomer to living radical polymerization under specific conditions using a specific solvent at a specific mass ratio, via radical polymerization, which has been conventionally regarded as being extremely difficult as a polymerization method for a vinyl ether monomer, a vinyl ether polymer having narrow molecular weight distribution is able to be obtained.

Specifically, the present technology provides the following (I) to (V).

(I) A production method for a vinyl ether polymer, comprising the step of polymerizing a vinyl ether monomer to obtain a vinyl ether polymer. The vinyl ether monomer is subjected to living radical polymerization using a polymerization initiator, a monovalent copper compound, a ligand which is coordinated to the above copper compound, and ascorbic acid in a solvent. The above solvent has a mass ratio of isopropyl alcohol to water from 30:70 to 0:100. A mass ratio of the above vinyl ether monomer to the above solvent is from 10:100 to 25:100. A molar ratio of copper (I) in the above copper compound to the above ascorbic acid is from 1:0.5 to 1:2.

(II) The production method for a vinyl ether polymer according to the above (I), wherein the above vinyl ether monomer is a compound represented by any one of formulae (1) to (4) described later.

(III) The production method for a vinyl ether polymer according to the above (I) or (II), wherein the above polymerization initiator is an organic halide in which a halogen atom is bound to a tertiary carbon atom.

(IV) The production method for a vinyl ether polymer according to any one of the above (I) to (III), wherein the above ligand is a compound represented by the formula (5) or (6) described later.

(V) The production method for a vinyl ether polymer according to the above (IV), wherein an amount of the above ligand is 2 or more moles per 1 mole of copper (I) in the above copper compound.

According to the present technology, a production method for a vinyl ether polymer in which a vinyl ether polymer having narrow molecular weight distribution is obtained by radical polymerization may be provided.

DETAILED DESCRIPTION

Production Method for Vinyl Ether Polymer

The production method for a vinyl ether polymer of the present technology (hereinafter, also called "production method of the present technology") is a method in which living radical polymerization is carried out under specific conditions using a specific solvent to a vinyl ether monomer at a specific mass ratio to obtain a vinyl ether polymer having narrow molecular weight distribution.

Solvent

A solvent used in the production method of the present technology is a solvent in which the mass ratio of isopropyl alcohol (hereinafter, also called "IPA" for short) to water is from 30:70 to 0:100.

Using a solvent of such a specific ratio enables polymerization by radical polymerization which has been conventionally regarded as being extremely difficult, as a polymerization method for a vinyl ether monomer.

As shown in Table 1 (Part 1) of "Working Examples" described later, it is found that since the molecular weight of a vinyl ether polymer that is produced is extremely low in a solvent (for example, Blending Example 8) in which the mass ratio is off, the radical polymerization does not progress. That is, there exists technical significance in the above mass ratio (mixing ratio).

In the present technology, the mass ratio of the IPA to water in the above solvent is preferably from 20:80 to 10:90 due to the reason that the molecular weight distribution of a polymer that is obtained becomes narrower.

Vinyl Ether Monomer

A vinyl ether monomer used in the production method of the present technology is not particularly limited as long as the monomer is a compound having $CH_2=CH—O—$ backbone (vinyl ether group), and, for example, it is preferred to use a compound represented by any one of the following formulae (1) to (4).

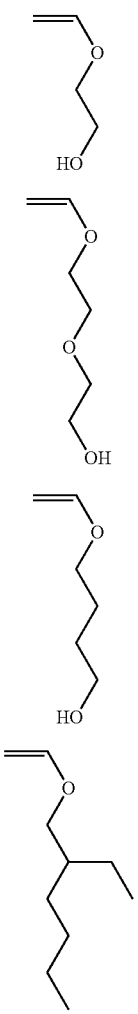

(1)
(2)
(3)
(4)

Ratio of Vinyl Ether Monomer to Solvent

In the production method of the present technology, the above vinyl ether monomer and the above solvent are used at the mass ratio at which the vinyl ether monomer: the solvent is from 10:100 to 25:100.

Using these at the above mass ratio makes it possible to obtain a vinyl ether polymer having narrow molecular weight distribution by the radical polymerization which has been conventionally regarded as being extremely difficult, as the polymerization method for a vinyl ether monomer.

As shown in Table 1 (Part 1) of "Working Examples" described later, it is found that since in Blending Example 4 in which the above mass ratio is off, the value of the molecular weight distribution of a vinyl ether polymer that is produced is 2.0 or more and radical polymerization proceeds, however a polymer having narrow molecular weight distribution cannot be obtained. That is, there exists technical significance in the above mass ratio (blending ratio).

In the present technology, the mass ratio of the above vinyl ether monomer to the above solvent is preferably from 10:100 to 20:100, due to the reason that the molecular weight distribution of a polymer that is obtained becomes narrower.

Living Radical Polymerization

The radical polymerization of the present technology is living radical polymerization, and more particularly, atom transfer radical polymerization, from the viewpoint of obtaining a polymer having narrow molecular weight distribution.

The atom transfer radical polymerization, a type of living radical polymerization, is generally carried out using an organic halide as a polymerization initiator, and further using a transition metal complex as a polymerization catalyst. In addition, since it is difficult to handle a transition metal complex in a low oxidation state due to being readily oxidized, known is a method by which a reducing agent such as ascorbic acid is added in a reaction system to initiate living radical polymerization.

In the production method of the present technology, the living radical polymerization is made using a polymerization initiator, a monovalent copper complex (polymerization catalyst) comprising a monovalent copper compound and a ligand, and ascorbic acid (reducing agent).

Polymerization Initiator

As the above polymerization initiator, conventionally known polymerization initiators for an atom transfer radical polymerization process may be appropriately used. Examples thereof include an organic halide, such as 1-phenylethyl chloride, 1-phenylethyl bromide, chloroform, carbon tetrachloride, 2-bromopropionitrile, 2-chloropropionic acid and a derivative thereof, 2-bromopropionate and a derivative thereof, 2-chloroisobutyric acid and a derivative thereof, and 2-bromoisobutyric acid and a derivative thereof.

Among these examples, from the viewpoint of efficiency of polymerization initiation, an organic halide in which a halogen atom is bound to a tertiary carbon atom is preferable, 2-bromoisobutyrate ester is more preferable, ethyl 2-bromoisobutyrate (EBIB) and propyl 2-bromoisobutyrate (PBIB) are even more preferable, and ethyl 2-bromoisobutyrate (EBIB) is most preferable.

It should be noted that the amount of the above polymerization initiator is not particularly limited, but is approximately from 0.005 to 0.5 parts by mass per 100 parts by mass of the above vinyl ether monomer, and is preferably from 0.005 to 0.05 parts by mass.

Monovalent Copper Complex

The above copper complex comprises a monovalent copper compound which generates radicals from the above polymerization initiator, and a ligand which is coordinated to the above copper compound to dissolve the above copper compound in the above solvent.

For example, the above copper compound and the above ligand are added in the above solvent and stirred in advance before the above polymerization initiator is added in the above solvent to initiate polymerization, and the above copper complex can be deemed to be formed upon dissolution of the above copper compound.

Monovalent Copper Compound

Examples of the above copper compound include cuprous chloride, cuprous bromide, cuprous iodide, cuprous cyanide, cuprous oxide, and cuprous perchlorate, and cuprous chloride (CuCl (I)) and cuprous bromide (CuBr (I)) are preferable because of being low cost and easily available.

It should be noted that the amount of the above copper compound is not particularly limited, but is approximately from 0.001 to 0.07 parts by mass per 100 parts by mass of the above vinyl ether monomer, and is preferably from 0.002 to 0.05 parts by mass.

Ligand

The above ligand is not particularly limited, but may adopt, for example, a nitrogen-containing compound, particularly a chelate type nitrogen-containing compound. Specific examples thereof include triethylamine, tributylamine, 2,2'-bipyridyl and a derivative thereof, 1,10-phenanthroline and a derivative thereof, tetramethylethylenediamine, pentamethyldiethylenetriamine, hexamethyltris(2-aminoethyl)amine, and tris(2-(pyridyl)methyl)amine.

Among these examples, triethylamine represented by the following formula (5), and tetramethylethylenediamine represented by the following formula (6) are preferable due to the reason that a polymer having narrower molecular weight distribution can be obtained.

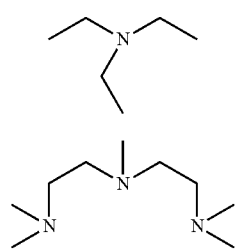

(5)

(6)

If the amount of the above ligand is too little, the molecular weight of obtainable polymers may become extremely low and polymerization may not proceed sufficiently. Thus, from the viewpoint of obtaining suitable molecular weight of polymers, the amount thereof is preferably 2 or more moles per 1 mole of copper (I) in the above copper compound, and is more preferably 2.5 or more moles.

It should be noted that the upper limit of the amount of the above ligand is not particularly limited, but is preferably 10 or less moles per 1 mole of copper (I) in the above copper compound.

Ascorbic Acid

The above ascorbic acid is a reducing agent used in combination with the above copper complex, and reduces the copper complex in a high oxidation state in the above solvent into a low oxidation state.

In the production method of the present technology, the above ascorbic acid is used in the amount in which the molar ratio of copper (I) in the above copper compound to the above ascorbic acid is from 1:0.5 to 1:2.

Using the above ascorbic acid at the above molar ratio makes it possible to obtain a vinyl ether polymer having narrow molecular weight distribution by radical polymerization which has been conventionally regarded as being extremely difficult, as the polymerization method of a vinyl ether monomer.

As shown in Table 1 (Part 2) of "Working Examples" described later, it is found that since in Blending Example 16 in which the above mass ratio is off, the value of the molecular weight distribution of a vinyl ether polymer that is produced is 2.0 or more and radical polymerization proceeds, however a polymer having narrow molecular weight distribution cannot be obtained. That is, there exists technical significance in the above molar ratio.

In the present technology, the above molar ratio is preferably from 1:0.5 to 1:1.5 from the viewpoint of reduction effects and economic efficiency.

Other Conditions of Living Radical Polymerization

Conditions of living radical polymerization in the production method of the present technology are not particularly limited except for the above-mentioned conditions, and may adopt conventionally known polymerization conditions as appropriate.

For example, polymerization can be allowed to proceed by an 8 to 20 hour reaction under conditions of from 70 to 100° C.

Vinyl Ether Polymer

The molecular weight distribution (Mw/Mn) of a vinyl ether polymer that is obtained by the production method of the present technology requires a value thereof to be less than 2.0, preferably 1.5 or less and more preferably 1.4 or less from the viewpoint that the polymer is capable of structural control, resulting in more stable mechanical properties as a polymer, and the like.

It should be noted that the lower limit of the molecular weight distribution (Mw/Mn) is not particularly limited, but is preferably 1.0 or more.

Further, the weight average molecular weight (Mw) is not particularly limited because of being different depending on the kind of the above vinyl ether monomer, the mass ratio of the above solvent, or the like, but is approximately from 5,000 to 50,000, and is preferably from 10,000 to 30,000.

The weight average molecular weight (Mw) and the number average molecular weight (Mn) are measured by gel permeation chromatography (GPC) in terms of standard polystyrene conversion.

EXAMPLES

Hereinafter, the production method of the present technology will be described in detail using examples. However, the present technology is not limited to these examples.

Blending Examples 1 to 16

The components shown in the following Table 1 were blended so as to reach the composition ratio shown in the same table (part by mass, and described later, ascorbic acid and ligand are "molar ratio"), and these components were subjected to a 16-hour-reaction (radical polymerization) at 80° C. to form a polymer.

Specifically, the monomers and solvents shown in the same table were put in a Schlenk flask, and deaeration with nitrogen was carried out for 30 minutes.

Next, the copper compound and ligands (ligands 1 and 2) shown in the same table were mixed, added in the above Schlenk flask, and then stirred for approximately 1 hour until the copper compound was dissolved.

After stirring, the initiator and ascorbic acid shown in the same table were added and sealed, followed by putting the above Schlenk flask in an oil bath set to 80° C. to initiate polymerization.

After 16 hours, the above Schlenk flask was removed, methanol was excessively added, and polymerization reaction was brought to a stop.

Thereafter, the polymer that was formed was subjected to reprecipitation treatment using methanol, dried, and purified.

It should be noted that the weight average molecular weight (Mw) and molecular weight distribution (Mw/Mn) of the purified polymer are shown in the same table. However, when the weight average molecular weight (Mw) was as low as the molecular weight of a monomer or an oligomer and polymerization did not progress, molecular weight distribution is described as the sign "–".

It should be noted that in the following Table 1, "the molar ratio" of the ascorbic acid indicates the blending amount of ascorbic acid converted into a molar ratio to 1 mole of copper (I) of the copper compound in the same table.

Similarly, the "molar ratio" of ligands indicates the blending amounts of ligands (ligands 1 and 2) converted into the molar ratio to 1 mole of copper (I) of the copper compound in the same table.

First, when Blending Examples 1 to 4 shown in Table 1 (Part 1) were viewed, in Blending Examples 1 to 3 in which a monomer was blended with a solvent (IPA/water) at a specific mass ratio, a polymer having molecular weight distribution of less than 2.0 (1.5 or less) was obtained, while in Blending Example 4 in which the mass ratio of the monomer was off, a polymer having molecular weight distribution of less than 2.0 was not obtained.

Further, when Blending Examples 5 to 8 shown in Table 1 (Part 1) were viewed, in Blending Examples 5 to 7 using a solvent in which IPA and water were at a specific mass ratio, a polymer having molecular weight distribution of less than 2.0 (1.5 or less) was obtained, while in Blending Example 8 using a solvent in which the mass ratio was off, the molecular weight of a product was low and polymerization did not proceed, and thus a polymer was not obtained.

TABLE 1

| | | Blending Examples | | | | | | | |
|---|---|---|---|---|---|---|---|---|---|
| | | 1 | 2 | 3 | 4 Comparative Example | 5 | 6 | 7 | 8 Comparative Example |
| | | Working Example | | | | Working Example | | | |
| Monomer | HEVE | 10 | 20 | 25 | 30 | 20 | ← | ← | ← |
| | DEGV | | | | | | | | |
| | HBVE | | | | | | | | |
| | EHVE | | | | | | | | |
| Solvent | IPA | 30 | ← | ← | ← | 20 | 10 | 0 | 100 |
| | Water | 70 | ← | ← | ← | 80 | 90 | 100 | 0 |
| Initiator | EBIB | 0.0025 | ← | ← | ← | ← | ← | ← | ← |
| Copper compound | Copper chloride (I) | 0.0007 | ← | ← | ← | ← | ← | ← | ← |
| Ascorbic acid (Molar ratio) | | 0.5 | ← | ← | ← | ← | ← | ← | ← |
| Ligand 1 (Molar ratio) | | 2.5 | ← | ← | ← | ← | ← | ← | ← |
| Molecular weight (Mw) | | 19800 | 20560 | 26110 | 72400 | 16390 | 18330 | 24770 | 150 |
| Molecular weight distribution (Mw/Mn) | | 1.23 | 1.35 | 1.48 | 2.33 | 1.43 | 1.28 | 1.48 | — |

| | | Blending Examples | | | | | | | |
|---|---|---|---|---|---|---|---|---|---|
| | | 9 | 10 | 11 | 12 | 13 | 14 | 15 | 16 Comparative Example |
| | | | | | Working Example | | | | |
| Monomer | HEVE | 10 | | | | | | | |
| | DEGV | | | | | | | | |
| | HBVE | | 10 | | 10 | ← | ← | ← | ← |
| | EHVE | | | 10 | | | | | |
| Solvent | IPA | 30 | ← | ← | ← | ← | ← | ← | ← |
| | Water | 70 | ← | ← | ← | ← | ← | ← | ← |
| Initiator | EBIB | 0.0025 | ← | ← | ← | ← | | | 0.0025 |
| | PBIB | | | | | | 0.0025 | | |
| | 1-PCl | | | | | | | 0.0025 | |
| Copper compound | Copper chloride (I) | 0.0007 | ← | ← | ← | ← | ← | ← | ← |
| Ascorbic acid (Molar ratio) | | 0.5 | ← | ← | 1 | 2 | 1 | 1 | 3 |
| Ligand 2 (Molar ratio) | | 2.5 | ← | ← | ← | ← | ← | ← | ← |
| Molecular weight (Mw) | | 22550 | 23400 | 17600 | 21550 | 24000 | 21000 | 27900 | 35440 |
| Molecular weight distribution (Mw/Mn) | | 1.29 | 1.43 | 1.44 | 1.50 | 1.43 | 1.59 | 1.89 | 2.11 |

The components shown in Table 1 are as follows.
HEVE: Vinyl ether monomer represented by the above formula (1) (molecular weight: 74)
DEGV: Vinyl ether monomer represented by the above formula (2) (molecular weight: 132)
HBVE: Vinyl ether monomer represented by the above formula (3) (molecular weight: 116)
EHVE: Vinyl ether monomer represented by the above formula (4) (molecular weight: 156)
IPA: Isopropyl alcohol
Water: Water
EBIB: Ethyl 2-bromoisobutyrate
PBIB: Propyl 2-bromoisobutyrate
1-PCl: 1-phenylethyl chloride
Copper chloride (I): Cuprous chloride (CuCl (I))
Ascorbic acid: Ascorbic acid
Ligand 1: Compound represented by the above formula (5)
Ligand 2: Compound represented by the above formula (6)

Further, when Blending Examples 9 to 11 shown in Table 1 (Part 2) were viewed, it was found that even if a monomer that was used was changed, a polymer having molecular weight distribution of less than 2.0 (1.5 or less) was obtained.

Further, when Blending Examples 12, 13 and 16 shown in Table 1 (Part 2) were viewed, in Blending Examples 12 and 13 in which ascorbic acid was used at a specific content ratio, a polymer having molecular weight distribution of less than 2.0 (1.5 or less) was obtained, while in Blending Example 16 in which the content ratio of the ascorbic acid was off, a polymer having molecular weight distribution of less than 2.0 was not obtained.

Further, when Blending Examples 12, 14 and 15 shown in Table 1 (Part 2) were viewed, it was found that the molecular weight distribution of a polymer obtained by using ethyl 2-bromoisobutyrate (EBIB) and propyl 2-bromoisobutyrate (PBIB) as a polymerization initiator became low, and particularly using the ethyl 2-bromoisobutyrate (EBIB) made the molecular weight distribution of a polymer that was obtained to be 1.5 or less.

What is claimed is:

1. A production method for a vinyl ether polymer, the method comprising the step of polymerizing a vinyl ether monomer to obtain a vinyl ether polymer;

a vinyl ether monomer being subjected to living radical polymerization using a polymerization initiator, a monovalent copper compound, a ligand which is coordinated to the copper compound, and ascorbic acid in a solvent;

the solvent having a mass ratio of isopropyl alcohol to water from 30:70 to 0:100;

a mass ratio of the vinyl ether monomer to the solvent being from 10:100 to 25:100; and a molar ratio of copper (I) in the copper compound to the ascorbic acid being from 1:0.5 to 1:2.

2. The production method for a vinyl ether polymer according to claim 1, wherein the vinyl ether monomer is a compound represented by any one of the following formulae (1) to (4):

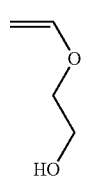
(1)

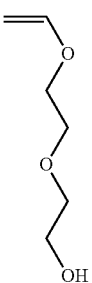
(2)

(3)

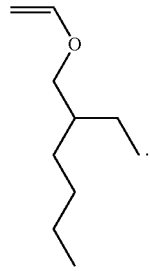
(4)

3. The production method for a vinyl ether polymer according to claim 1, wherein the polymerization initiator is an organic halide in which a halogen atom is bound to a tertiary carbon atom.

4. The production method for a vinyl ether polymer according to claim 1, wherein the ligand is a compound represented by the following formula (5) or (6):

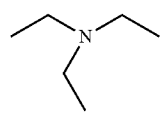
(5)

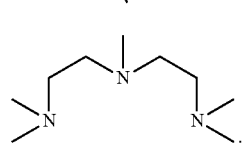
(6)

5. The production method for a vinyl ether polymer according to claim 4, wherein an amount of the ligand is 2 or more moles per 1 mole of copper (I) in the copper compound.

6. The production method for a vinyl ether polymer according to claim 2, wherein the polymerization initiator is an organic halide in which a halogen atom is bound to a tertiary carbon atom.

7. The production method for a vinyl ether polymer according to claim 6, wherein the ligand is a compound represented by the following formula (5) or (6):

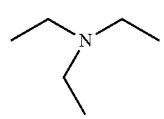
(5)

-continued

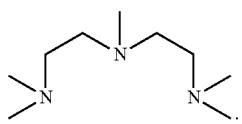
(6)

8. The production method for a vinyl ether polymer according to claim 7, wherein an amount of the ligand is 2 or more moles per 1 mole of copper (I) in the copper compound.

9. The production method for a vinyl ether polymer according to claim 2, wherein the ligand is a compound represented by the following formula (5) or (6):

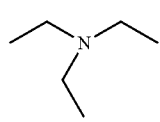
(5)

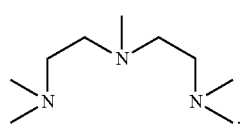
(6)

10. The production method for a vinyl ether polymer according to claim 9, wherein an amount of the ligand is 2 or more moles per 1 mole of copper (I) in the copper compound.

11. The production method for a vinyl ether polymer according to claim 3, wherein the ligand is a compound represented by the following formula (5) or (6):

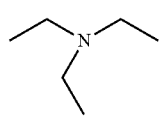
(5)

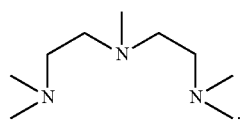
(6)

12. The production method for a vinyl ether polymer according to claim 11, wherein an amount of the ligand is 2 or more moles per 1 mole of copper (I) in the copper compound.

13. The production method for a vinyl ether polymer according to claim 1, wherein the vinyl ether monomer is a compound represented by formula (1):

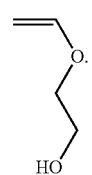
(1)

14. The production method for a vinyl ether polymer according to claim 1, wherein the vinyl ether monomer is a compound represented by formula (2):

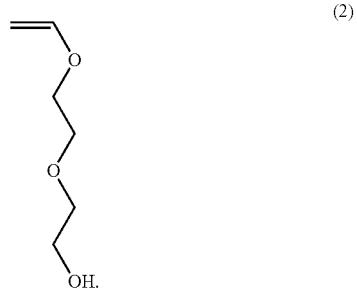
(2)

15. The production method for a vinyl ether polymer according to claim 1, wherein the vinyl ether monomer is a compound represented by formula (3):

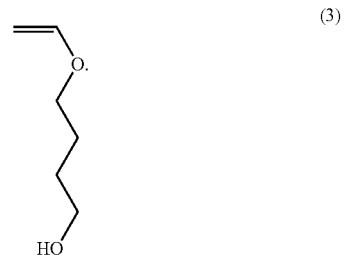
(3)

16. The production method for a vinyl ether polymer according to claim 1, wherein the vinyl ether monomer is a compound represented by formula (4):

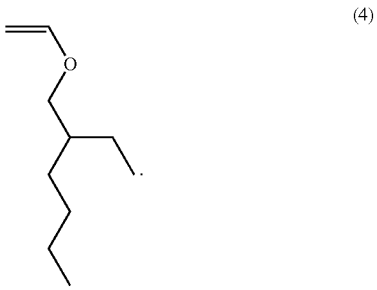
(4)

17. The production method for a vinyl ether polymer according to claim 1, wherein the ligand is a compound represented by the following formula (5):

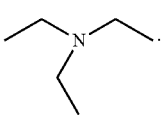
(5)

18. The production method for a vinyl ether polymer according to claim 1, wherein the ligand is a compound represented by the following formula (6):
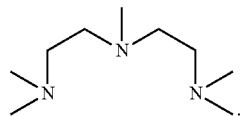
(6)